(12) United States Patent
Wendel et al.

(10) Patent No.: US 9,075,137 B2
(45) Date of Patent: Jul. 7, 2015

(54) METHOD AND SYSTEM FOR DETERMINING THE POSITION OF A GNSS RECEIVER ARRANGED IN A MOTOR VEHICLE

(75) Inventors: Jan Wendel, Munich (DE); Wolfgang Kogler, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 376 days.

(21) Appl. No.: 13/524,243

(22) Filed: Jun. 15, 2012

(65) Prior Publication Data
US 2012/0319897 A1 Dec. 20, 2012

(30) Foreign Application Priority Data
Jun. 16, 2011 (DE) .......................... 10 2011 106 591

(51) Int. Cl.
G01S 19/20 (2010.01)
G01S 19/21 (2010.01)
G01S 19/03 (2010.01)

(52) U.S. Cl.
CPC .............. *G01S 19/215* (2013.01); *G01S 19/03* (2013.01)

(58) Field of Classification Search
CPC ......... G01S 19/20; G01S 19/16; G01S 19/26; G01S 19/215
USPC ...................... 342/357.59, 357.54, 357.69, 14
See application file for complete search history.

(56) References Cited

U.S. PATENT DOCUMENTS

| 6,407,699 B1 * | 6/2002 | Yang ........................ 342/357.59 |
| 6,839,017 B1 * | 1/2005 | Dillman .......................... 342/16 |
| 7,801,680 B2 * | 9/2010 | Chen .............................. 701/484 |
| 7,952,519 B1 * | 5/2011 | Nielsen et al. ................. 342/378 |
| 8,159,336 B2 * | 4/2012 | Snider et al. ................. 340/426.1 |
| 2006/0244577 A1 * | 11/2006 | Tanaka et al. .................. 340/429 |
| 2008/0316042 A1 | 12/2008 | Scales |
| 2010/0275530 A1 * | 11/2010 | Laskowski et al. .......... 52/173.1 |

(Continued)

FOREIGN PATENT DOCUMENTS

| DE | 10 2008 043 506 | 5/2010 |
| DE | 10 2009 057 550 | 6/2011 |
| WO | 2011/084617 | 7/2011 |

OTHER PUBLICATIONS

Wen et al., "Countermeasures for GPS Signal Spoofing", Proceedings of ION GPS/GNSS, XX, XX, Nr. 18th, XP007903714, Sep. 13, 2005, pp. 1285-1390.

(Continued)

*Primary Examiner* — Harry Liu
(74) *Attorney, Agent, or Firm* — Greenblum & Bernstein, P.L.C.

(57) ABSTRACT

Method and system for determining, via sensor network, position of GNSS receiver arranged in a motor vehicle intentionally is impaired in a targeted manner by interference source. Sensor network includes traffic route points having at least one sensor to detect a presence of interference source. Method includes detecting, as motor vehicle passes one of traffic route points, an interference signal emitted by interference source and/or a received signal of GNSS receiver impaired by interference source by the at least one sensor of the one traffic route point; processing the detected signals to establish whether interference source is present in passing motor vehicle; and when the presence of interference source established, generating information that signals at least a location of the one traffic route point and the interference source in the motor vehicle. A position of the motor vehicle is determined from the location of the traffic route point.

17 Claims, 2 Drawing Sheets

(56) References Cited

U.S. PATENT DOCUMENTS

2011/0148609 A1* 6/2011 Dabholkar et al. ......... 340/426.1
2011/0148610 A1* 6/2011 Snider et al. ............. 340/426.22
2012/0032854 A1* 2/2012 Bull et al. .................... 342/450
2012/0309422 A1* 12/2012 Lewis-Evans et al. ..... 455/456.1

OTHER PUBLICATIONS

European Search Report conducted in counterpart European Appln. No. 120 04 514.1-2220 (Oct. 30, 2012).

* cited by examiner

METHOD AND SYSTEM FOR DETERMINING THE POSITION OF A GNSS RECEIVER ARRANGED IN A MOTOR VEHICLE

CROSS-REFERENCE TO RELATED APPLICATIONS

The present application claims priority under 35 U.S.C. §119 of German Patent Application No. 10 2011 106 591.5, filed on Jun. 16, 2011, the disclosure of which is expressly incorporated by reference herein in its entirety.

BACKGROUND OF THE INVENTION

1. Field of the Invention

The invention relates to a method for determining the position of a GNSS receiver arranged in a motor vehicle, the intended function of which receiver is impaired in a targeted manner by an interference source in a motor vehicle, by means of a sensor network that comprises one or more sensors for interference source detection at predetermined traffic route points. The invention furthermore relates to a system of this type for determining the position of a GNSS receiver arranged in a motor vehicle, the intended function of which receiver is impaired in a targeted manner by an interference source in a motor vehicle.

2. Discussion of Background Information

GNSS (Global Navigation Satellite System) receivers determine their position from the GNSS signals emitted by a plurality of satellites. GNSS receivers of this type are used in motor vehicles, among other things. In the event of theft, they are used to transmit their current position to the owner, the manufacturer of the vehicle or a service provider in order to make it possible to find/locate the vehicle. Position data determined by a GNSS receiver are also used to obtain information on the roads covered by the motor vehicle. On the basis of this information, a road user charge can then be calculated and billed to the driver or owner of the motor vehicle.

The operation of GNSS receivers can be impaired in a targeted manner by interference sources arranged in the motor vehicle. Interference sources, commonly referred to as "jammers," prevent the detection and the evaluation/use of GNSS signals emitted by satellites and thus prevent position determination by the GNSS receiver. Further, use of interference sources can also render the above-described theft recovery functionality effectively inoperative. For example, other interference sources, referred to as "spoofers," simulate a GNSS signal transmitted by a satellite to the GNSS receiver. This "spoofed" signal is then used by the GNSS receiver to determine a position solution that does not correspond to the actual position.

SUMMARY OF THE EMBODIMENTS

Embodiments of the present invention are directed to a method and a system, with which the determination of the position of a GNSS receiver arranged in a motor vehicle is rendered possible even if the intended function thereof is impaired in a targeted manner by an interference source in the motor vehicle.

According to embodiments, the method provides that: when the motor vehicle passes one of a number of the traffic route points, an interference signal emitted by the interference source and/or a received signal of the GNSS receiver impaired by the interference source are detected by a sensor unit of the traffic route point; the detected signals are processed in order to establish the presence of the interference source in the motor vehicle; and in the case of the presence of the interference source, information is generated that signals at least the location of the traffic route point and the interference source in the motor vehicle, wherein the position of the motor vehicle is determined from the location of the traffic route point. Moreover, the system includes a respective sensor unit arranged at predetermined traffic route points, wherein the sensor unit is embodied to detect, when the motor vehicle passes one of the traffic route points, an interference signal emitted by the interference source and/or a received signal of the GNSS receiver impaired by the interference source; a computer unit provided for processing the detected signals in order to establish the presence of the interference source in the motor vehicle. Further, in the event of the presence of the interference source, information can be generated which signals at least the location of the traffic route point and the interference source in the motor vehicle, wherein the position of the motor vehicle can be determined from the location of the traffic route point.

The invention provides a method for determining the position of a GNSS (or GPS or other positioning device) receiver arranged in a motor vehicle. As the intended function of the GNSS receiver is impaired in a targeted manner by an interference source in the motor vehicle, the method uses a sensor network that includes a respective sensor unit for detecting interference sources at predetermined traffic route points. Within the scope of the present disclosure, an interference source is understood to mean jammers as well as spoofers. As discussed above, jammers prevent the detection and/or processing/use of a GNSS signal emitted by satellites and thus prevent the position determination by the GNSS receiver arranged in the motor vehicle, while spoofers emit a false GNSS signal, which is interpreted by the GNSS receiver arranged in the motor vehicle as a regular GNSS signal emitted by a satellite, whereby a false position solution is determined by the GNSS receiver.

With the method according to the embodiments, when the motor vehicle passes one of the traffic route points, an interference signal emitted by the interference source and/or a received signal of the GNSS receiver impaired by the interference source is/are detected by the sensor or sensors of the traffic route point. Subsequently, the detected signals are processed in order to establish the presence of the interference source in the motor vehicle. In the case of the presence of the interference source, information is generated to signal at least the location of the traffic route point and the interference source in the motor vehicle, so that the position of the motor vehicle is determined from the location of the traffic route point.

Embodiments of the invention furthermore create a system for determining the position of a GNSS receiver arranged in a motor vehicle, in which the intended function of the GNSS receiver is impaired in a targeted manner by an interference source in the motor vehicle. In accordance with the system, a respective sensor unit is arranged at predetermined traffic route points. In this way, when the motor vehicle passes one of the traffic route points, the sensors are embodied and arranged to detect an interference signal emitted by the interference source and/or a received signal of the GNSS receiver impaired by the interference source. Furthermore, a computer unit is provided for processing the detected signals in order to establish the presence of the interference source in the motor vehicle. In the event of the presence of the interference source, information can be generated by the system which signals at least the location of the traffic route point and the interference source in the motor vehicle, wherein the position of the motor vehicle can be determined from the location of the traffic route point.

An interference signal is understood to be any type of signal that is emitted by the interference source. This can thus be a signal that prevents the reception of regular GNSS signals from satellites or simulates a GNSS signal.

The position of the motor vehicle or of the GNSS receiver arranged therein is thus determined in an indirect manner by the approach according to the embodiments, rather than being directly carried out by a GNSS receiver. In this regard, the interference sources assigned to the GNSS receiver which impair the function of the GNSS receiver are determined in order from the location of the interference source detection to determine the position of the GNSS receiver and thus of the motor vehicle. It is thus possible not only to track down a manipulation of the functionality of the GNSS receiver, the actual functionality of the GNSS receiver (theft protection or route determination) can thus be at least partially restored.

In the event that the GNSS receiver is used for theft protection for the motor vehicle, the position of the motor vehicle can be detected by the detection of the interference sources at the respective traffic route point. If the motor vehicle passes a plurality of such traffic route points, a movement profile can be determined. On the other hand, if the interference source is deactivated at the traffic route points in order to cover up the manipulation, the GNSS receiver is again able to transmit its current position to a superordinate system so that the position of the motor vehicle can likewise be determined. If the GNSS receiver is used to determine the traffic routes used by the motor vehicle—provided that there is a corresponding sensor network with sensor units at predetermined traffic route points—the route covered by the motor vehicle can also be determined without an "active" GNSS receiver.

In a preferred embodiment of the invention a spectrum monitoring method is carried out to determine the presence of a jammer by means of the traffic route point. Alternatively or additionally, to determine the presence of a jammer, the performance of a reference GNSS receiver and its parameters with respect to the detection and tracking of a GNSS signal can be determined by the traffic route point. The two methods carried out either alternatively or together make it possible to detect jammers. The reference GNSS receiver for this purpose is preferably arranged in the traffic route point.

To determine the presence of a spoofer, correlation properties of a GNSS signal emitted by the spoofer and the GNSS signal emitted by at least one satellite are determined preferably by the traffic route point. Alternatively or additionally, to determine the presence of a spoofer by the traffic route point, reception strengths of the GNSS signal emitted by the spoofer and the GNSS signal emitted by at least one satellite can also be determined.

It is furthermore preferred if one or more of the following points are selected as a traffic route point for the arrangement of the sensor units: border crossings, facilities for determining road user charges, entrances and/or exits of marked-off areas, in particular car parks and/or parking garages, freeway on-ramps and/or off-ramps, highway on-ramps and/or off-ramps, street intersections, harbors, railway stations. Naturally, in addition to the cited traffic route points other traffic route points can also be provided with sensor units for interference source detection. The larger the number of traffic route points with sensor units for interference source detection, the more reliably the interference sources generally used illegally can be detected.

In a further preferred embodiment the information generated by the traffic route points additionally comprises the time of the detection of the interference source. Precise information on the location of the motor vehicle can be determined by the combination of the time of the detection of the interference source with the location of the traffic route point. The combination of time and place is particularly helpful when the motor vehicle with activated interference source has passed a plurality of traffic route points. In this case it is possible to determine a traffic route profile.

In a further expedient embodiment, vehicle information identifying the motor vehicle is determined by the traffic route point, which information is integrated as a component into the information generated by the traffic route point. Vehicle information of this type can be, for example, a photo or a video recording that identifies the license plate of the motor vehicle and optionally the driver of the motor vehicle. The embodiment can be used when a direct intervention against the illegal use of the interference source is not necessary or possible. This could be the case, for example, in the case of levying road user charges.

It is furthermore preferred if the information generated by the traffic route point is transmitted to a central location. In this way, statutory violations can be tracked, for example. The central location could also be a service provider, which tracks down stolen vehicles based on a position determination of the vehicle.

Embodiments of the invention are directed to a method for determining, via a sensor network, a position of a GNSS receiver arranged in a motor vehicle that is intentionally is impaired in a targeted manner by an interference source, the sensor network including a plurality of predetermined traffic route points that have at least one sensor structured and arranged detecting a presence of the interference source. The method includes detecting, as the motor vehicle passes one of the plurality of predetermined traffic route points, at least one of an interference signal emitted by the interference source and a received signal of the GNSS receiver impaired by the interference source by the at least one sensor of the one traffic route point; processing the detected signals to establish whether the interference source is present in the passing motor vehicle; and when the presence of the interference source is established, generating information that signals at least a location of the one traffic route point and the interference source in the motor vehicle. A position of the motor vehicle is determined from the location of the traffic route point.

According to embodiments, to determine the presence of the interference source comprising a jammer, the one traffic route point can perform a spectrum monitoring method.

In accordance with other embodiments of the instant invention, to determine the presence of the interference source comprising a jammer, the method can further include determining with the one traffic route point a performance of a reference GNSS receiver and its parameters with respect to a detection and tracking of a GNSS signal.

According to still other embodiments, to determine the presence of the interference source comprising a spoofer, the method may further include determining with the one traffic route point correlation properties of a GNSS signal emitted by the spoofer and the GNSS signal emitted by at least one satellite.

According to still further embodiments of the invention, to determine the presence of the interference source comprising a spoofer, the method can further include determining reception strengths of the GNSS signal emitted by the spoofer and of the GNSS signal emitted by at least one satellite.

According to embodiments, the plurality of predetermined traffic route points can be positionable at border crossings, facilities for determining road user charges, entrances and/or exits of marked-off areas, car parks and/or parking garages, freeway on-ramps and/or off-ramps, highway on-ramps and/or off-ramps, street intersections, harbors, and railway stations.

In accordance with other embodiments of the invention, the information generated by the one traffic route point additionally can include a time of the detection of the interference source.

Moreover, the plurality of predetermined traffic route points can further include a vehicle information identifier to identify a motor vehicle, and the method may include integrating information about the identity of the motor vehicle with the information generated by the one traffic route point.

The method can also include transmitting the information generated by the one traffic route point to a central location.

Embodiments of the instant invention are directed to a system for determining a position of a GNSS receiver arranged in a motor vehicle that is intentionally impaired in a targeted manner by an interference source. The system includes a plurality of predetermined traffic route points, each comprising a sensor unit structured and arranged so that, as a motor vehicle passes one of the plurality of predetermined traffic route points, at least one of an interference signal emitted by the interference source and a received signal of the GNSS receiver impaired by the interference source is detected. A computer unit is structured and arranged for processing the detected signals in order to establish whether the interference source is present in the motor vehicle, and when the presence of the interference source is established, a signal generator is structured and arranged to generate information that signals at least a location of the one traffic route point and the interference source in the motor vehicle. A position of the motor vehicle is determined from the location of the traffic route point.

According to embodiments, the plurality of predetermined traffic route points may be positionable at border crossings, facilities for determining road user charges, entrances and/or exits of marked-off areas, car parks and/or parking garages, freeway on-ramps and/or off-ramps, highway on-ramps and/or off-ramps, street intersections, harbors, and railway stations.

According to other embodiments of the invention, the plurality of predetermined traffic route points can further include a vehicle information identifier structured and arranged to identify a motor vehicle, and a device for integrating information about the identity of the motor vehicle with the information generated by the one traffic route point.

In accordance with still yet other embodiments of the present invention, the system can also include a source identifier structured and arranged for discerning whether the interference source comprises at least one of a jammer and a spoofer. To discern the presence of a jammer, the source identifier can be structured and arranged to perform a spectrum monitoring method. Further, to discern the presence of a jammer, the source identifier may be structured and arranged to determine with the one traffic route point a performance of a reference GNSS receiver and its parameters with respect to a detection and tracking of a GNSS signal. To discern the presence of a spoofer, the source identifier can be structured and arranged to determine with the one traffic route point correlation properties of a GNSS signal emitted by the spoofer and the GNSS signal emitted by at least one satellite. Moreover, to discern the presence of a spoofer, the source identifier can be structured and arranged to determine reception strengths of the GNSS signal emitted by the spoofer and of the GNSS signal emitted by at least one satellite.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
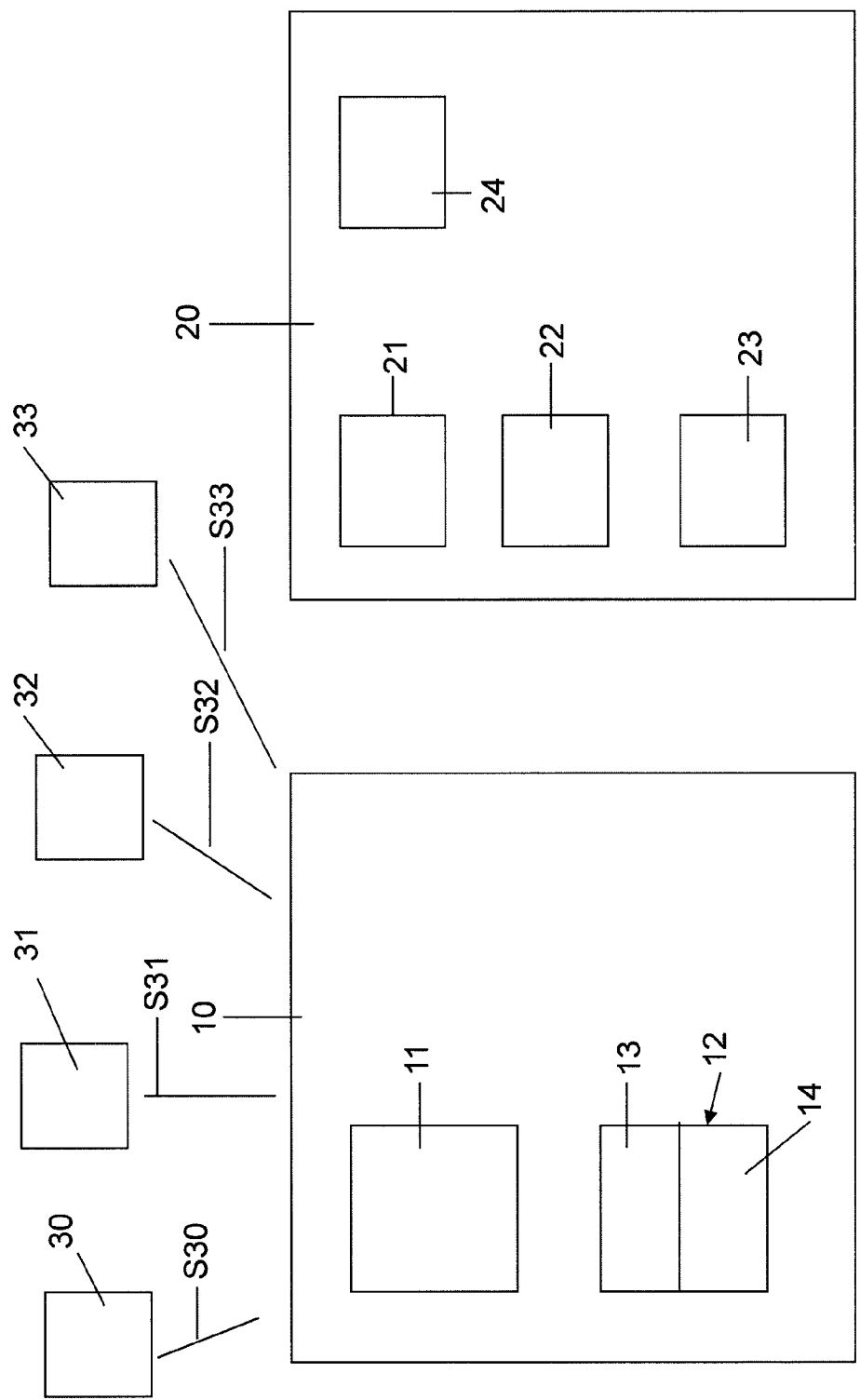
FIG. 1 diagrammatically represents a system according to the invention for determining the position of a GNSS receiver arranged in a motor vehicle, the intended function of which is impaired in a targeted manner by an interference source in the motor vehicle.

FIG. 1 shows in a diagrammatic representation a motor vehicle 10, in which a GNSS receiver 11 is arranged. GNSS receiver 11 receives GNSS signals S30, S31, S32, S33 from four satellites 30, 31, 32, 33 shown by way of example. From these GNSS signals S30, S31, S32, S33, GNSS receiver 11 is able to determine its position and thus the position of the motor vehicle. The position of the motor vehicle can optionally be processed inside the motor vehicle or by a central entity outside the motor vehicle. The central entity, not shown in FIG. 1, to this end receives the position data of the motor vehicle at regular or irregular intervals, for example, via a contactless communications interface, not shown either.

The position information of GNSS receiver 11 and thus of the motor vehicle 10 can be used, for example, to determine the route used by the motor vehicle. Based on this, any road user charge incurred can be determined and calculated, which can then be billed to the user or the owner of the motor vehicle.

The position information of GNSS receiver 11 can also be used, for example, to track the position of the motor vehicle in the event of theft. To this end the position determined by the GNSS receiver is transmitted to the central entity, which determines the location of the motor vehicle and can take corresponding measures for retrieving the motor vehicle.

The functionality of the GNSS receiver can be impaired permanently or temporarily by an interference source 12 installed or located in the motor vehicle 10. So-called jammers or spoofers are non-limiting examples of interference sources 12. Interference source 12 shown in FIG. 1 comprises, by way of example, a jammer 13 as well as a spoofer 14. Detection and tracking of GNSS signals S30, S31, S32, S33 emitted by satellites 30, 31, 32, 33 can be prevented by the jammer 13, which means that GNSS receiver 11 can no longer make any position determination.

The spoofer 14 transmits a signal detectable by the GNSS receiver 11 that is interpreted by the GNSS receiver 11 as a GNSS signal of a satellite. Since the signal emitted by the spoofer has similar correlation properties to GNSS signal S30, S31, S32, S33 received from a satellite, GNSS receiver 11 may use this for position determination. However, based on this "spoofed" manipulated signal, GNSS receiver 11 cannot determine any correct position solution therefrom.

The invention therefore provides for arranging sensor units 21 at a plurality of traffic route points 20. Sensor units of a plurality at traffic route points form a sensor network. In FIG. 1 only a single traffic route point 20 is shown by way of non-limiting example for ease of explanation. Traffic route point 20 comprises a sensor unit 21, a camera 22, a processing unit 23 and a reference GNSS receiver 24. Sensor unit 21 comprises one or more sensors for the detection of an interference source installed in a motor vehicle. Sensor unit 21 comprises, for example, corresponding antennas for signal determination.

Jammers in a motor vehicle can be recognized by a spectrum monitoring method being carried out by the sensor unit 21 of the traffic route point 20. Alternatively or additionally, for the detection of a jammer by the traffic route point 20 the performance of the reference GNSS receiver 24 and its parameters with respect to the detection and tracking of a GNSS signal can be determined. Corresponding methods are known to one skilled in the art and are therefore not explained in further detail at this point.

For the detection of a spoofer, correlation properties of a GNSS signal transmitted by the spoofer and of the GNSS signal S30, S31, S32, S33 emitted by at least one of the satellites 30, 31, 32, 33 is determined by the traffic route point 20. Alternatively or additionally, the reception strengths of the GNSS signal transmitted by the spoofer and of the GNSS signal S30, S31, S32, S33 emitted by at least one of the satellites 30, 31, 32, 33 can be determined. The means and method necessary for this for recognizing a spoofer are likewise known to the person skilled in the art from the prior art, so they are not further described at this point either.

Figure 2:
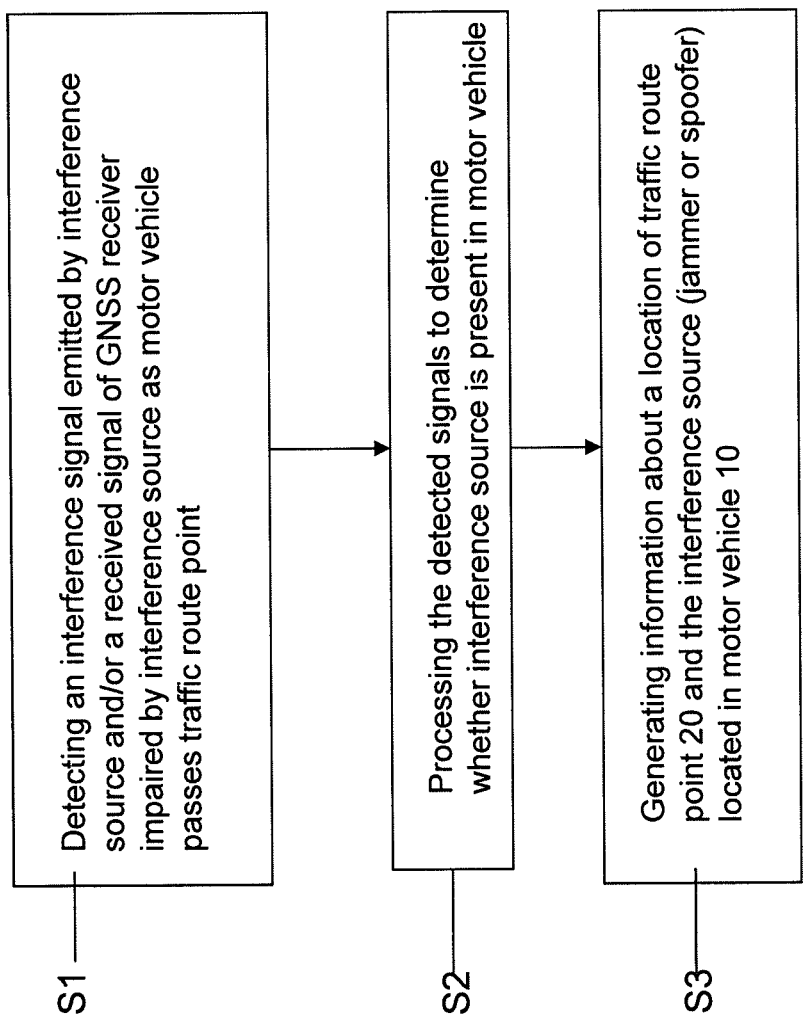
FIG. 2 illustrates a sequence of an embodiment of the method according to the invention.

The method according to the embodiments, which is shown diagrammatically in FIG. 2, includes in a step S1 that, as motor vehicle 10 passes traffic route point 20, an interference signal emitted by interference source 12 and/or a received signal S30, S31, S32, S33 of GNSS receiver 11 impaired by interference source 12 is detected by sensor unit 21 of traffic route point 20. These signals detected by traffic route point 20 are processed in a step S2 in order to establish the whether interference source 12 is present in motor vehicle 10. If interference source 12 is detected, information is generated by processing unit 23 of traffic route point 20 in step S3 that includes the location of traffic route point 20, the interference source 12 (jammer or spoofer) located in motor vehicle 10 and, optionally, the time motor vehicle 10 passed traffic route point 20. The position of motor vehicle 10 can be determined hereby based on the location of the traffic route point. Optionally, the information can also comprise image information of motor vehicle 10 passing traffic route point 20 and optionally of the driver thereof. The use of a jammer generally used illegally can hereby be carried out independently of passing the traffic route point in terms of time as well.

The larger the number of traffic route points equipped with sensors for detecting interference sources, the more precisely the route of a motor vehicle can be tracked. Preferably, the information generated by a respective traffic route point 20 is transmitted to a central location for further processing.

For example, border crossings, facilities for detecting road user charges, entrances and exits of marked-off areas, in particular car parks and/or parking garages, freeway on-ramps and/or off-ramps, highway on-ramps and/or off-ramps, street intersections, harbors, railway stations etc. can be selected as a traffic route point 20 of the type described above.

The approach described supports, for example, the tracking and recovery of stolen motor vehicles. Switching off interference source 12 when passing a traffic route point 20 means that, during the deactivated interference source 12, GNSS receiver 11 of motor vehicle 10 can determine its position and transmit it to a service provider for tracking the motor vehicle.

Users of interference sources who want to defraud the payment of road charges can be identified via traffic route points equipped according to the embodiments of the invention and correspondingly closely meshed. Moreover, the route covered can possibly also be reconstructed.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

10 Motor vehicle
11 GNSS receiver
12 Interference source
13 Jammer
14 Spoofer
20 Traffic route point
21 Sensor unit
22 Camera
23 Processing unit
24 Reference GNSS receiver
30 Satellite
31 Satellite
32 Satellite
33 Satellite
S1 Step
S2 Step
S3 Step

What is claimed:

1. A method for determining, via a sensor network, a position of a GNSS receiver arranged in a motor vehicle that is intentionally is impaired in a targeted manner by an interference source, the sensor network including a plurality of predetermined traffic route points that have at least one sensor structured and arranged detecting a presence of the interference source, the method comprising:

detecting, as the motor vehicle passes one of the plurality of predetermined traffic route points, at least one of an interference signal emitted by the interference source and a received signal of the GNSS receiver impaired by the interference source by the at least one sensor of the one traffic route point;

processing the detected signals to establish whether the interference source is present in the passing motor vehicle; and when the presence of the interference source is established, generating information that signals at least a location of the one traffic route point and the interference source in the motor vehicle;

wherein a position of the motor vehicle is determined from the location of the traffic route point.

2. The method according to claim 1, wherein, to determine the presence of the interference source comprising a jammer, the one traffic route point performs a spectrum monitoring method.

3. The method according to claim 1, wherein, to determine the presence of the interference source comprising a jammer, the method further comprises determining with the one traffic route point a performance of a reference GNSS receiver and its parameters with respect to a detection and tracking of a GNSS signal.

4. The method according to claim 1, wherein, to determine the presence of the interference source comprising a spoofer, the method further comprises determining with the one traffic route point correlation properties of a GNSS signal emitted by the spoofer and the GNSS signal emitted by at least one satellite.

5. The method according to claim 1, wherein, to determine the presence of the interference source comprising a spoofer, the method further comprises determining reception strengths of the GNSS signal emitted by the spoofer and of the GNSS signal emitted by at least one satellite.

6. The method according to claim 1, wherein the plurality of predetermined traffic route points are positionable at border crossings, facilities for determining road user charges, entrances and/or exits of marked-off areas, car parks and/or parking garages, freeway on-ramps and/or off-ramps, highway on-ramps and/or off-ramps, street intersections, harbors, and railway stations.

7. The method according to claim 1, the information generated by the one traffic route point additionally comprises a time of the detection of the interference source.

8. The method according to claim 1, wherein the plurality of predetermined traffic route points further comprises a vehicle information identifier to identify a motor vehicle, and the method further comprises integrating information about the identity of the motor vehicle with the information generated by the one traffic route point.

9. The method according to claim 1, further comprising transmitting the information generated by the one traffic route point to a central location.

10. A system for determining a position of a GNSS receiver arranged in a motor vehicle that is intentionally impaired in a targeted manner by an interference source, the system comprising:

a plurality of predetermined traffic route points, each comprising a sensor unit structured and arranged so that, as a motor vehicle passes one of the plurality of predetermined traffic route points, at least one of an interference signal emitted by the interference source and a received signal of the GNSS receiver impaired by the interference source is detected;

a computer unit structured and arranged for processing the detected signals in order to establish whether the interference source is present in the motor vehicle; and when the presence of the interference source is established, a signal generator is structured and arranged to generate information that signals at least a location of the one traffic route point and the interference source in the motor vehicle;

wherein a position of the motor vehicle is determined from the location of the traffic route point.

11. The system according to claim 10, wherein the plurality of predetermined traffic route points are positionable at border crossings, facilities for determining road user charges, entrances and/or exits of marked-off areas, car parks and/or parking garages, freeway on-ramps and/or off-ramps, highway on-ramps and/or off-ramps, street intersections, harbors, and railway stations.

12. The system according to claim 10, wherein the plurality of predetermined traffic route points further comprise a vehicle information identifier structured and arranged to identify a motor vehicle, and a device for integrating information about the identity of the motor vehicle with the information generated by the one traffic route point.

13. The system according to claim 10, further comprising a source identifier structured and arranged for discerning whether the interference source comprises at least one of a jammer and a spoofer.

14. The system according to claim 13, wherein, to discern the presence of a jammer, the source identifier is structured and arranged to perform a spectrum monitoring method.

15. The system according to claim 13, wherein, to discern the presence of a jammer, the source identifier is structured and arranged to determine with the one traffic route point a performance of a reference GNSS receiver and its parameters with respect to a detection and tracking of a GNSS signal.

16. The system according to claim 13, wherein, to discern the presence of a spoofer, the source identifier is structured and arranged to determine with the one traffic route point correlation properties of a GNSS signal emitted by the spoofer and the GNSS signal emitted by at least one satellite.

17. The system according to claim 13, wherein, to discern the presence of a spoofer, the source identifier is structured and arranged to determine reception strengths of the GNSS signal emitted by the spoofer and of the GNSS signal emitted by at least one satellite.

* * * * *